United States Patent Office 2,943,664
Patented July 5, 1960

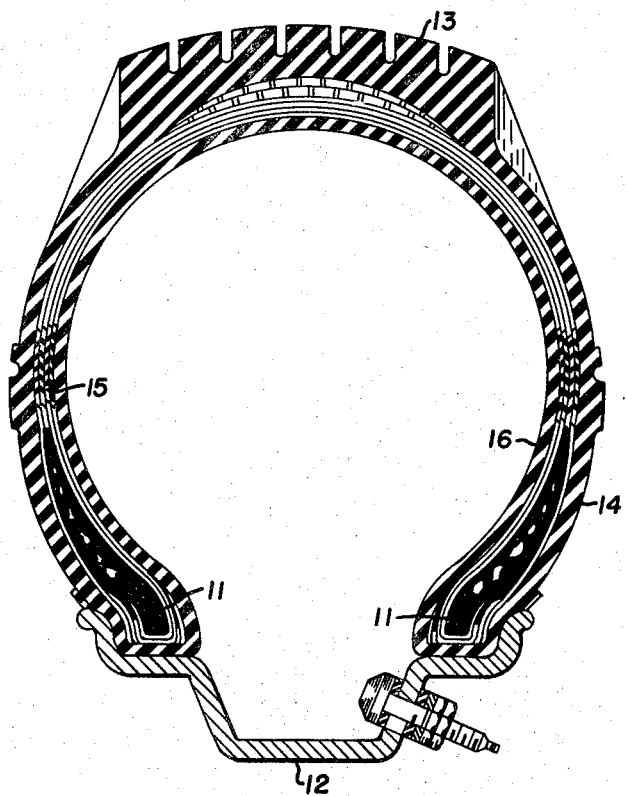

2,943,664

PNEUMATIC TIRE

Francis P. Baldwin, Colonia, Alfred L. Miller, Cranford, and Samuel B. Robison, Roselle, N.J., assignors to Esso Research and Engineering Company, a corporation of Delaware Filed July 9, 1956, Ser. No. 596,531

4 Claims. (Cl. 152—359)

This invention relates to coating compositions for natural or synthetic fibrous materials, to improve the adhesion thereof to natural or synthetic rubber, such as CR–S rubber, Buna-N rubber, and preferably butyl rubber. More particularly, the present invention relates to coating compositions containing chlorinated butyl rubber. The invention also involves processes for producing the aforesaid compositions and to methods of employing the same to obtain improved adhesion between a rubber and fibrous filaments, cords, threads, fabrics, etc. particularly in the presence of phenolic-aldehyde resins. The present invention also pertains to the resulting rubber-fibrous composites produced by the aforesaid processes.

Heretofore, cellulosic and synthetic fibers such as rayon, regenerated cellulose, such as nylon, and nylon threads, cords, or filaments have adhered very poorly to rubber and to compounded rubber stocks (especially containing butyl rubber) when they were united and the rubber stock was subsequently cured according to any known process for producing adhesion between rubber and fiber. This poor adhesion, especially of synthetic threads, cords and fabrics, to synthetic rubber has constituted a very serious obstacle to the more extensive use of butyl rubber in the manufacture of automobile tires, reinforced rubber belts and similar products consisting of alternate plies of rubber and cords. In these products the cord must adhere very strongly for long periods of time under drastic conditions of high temperature, constant flexing, bending and shock. For example, if nylon cord is pressed into butyl rubber or a butyl rubber stock and the composite is vulcanized, it will be observed that the nylon cord may be pulled away from the rubber with comparative facility. It has now been discovered that chlorinated butyl rubber is an excellent adhesive for fabric to rubber bonds. In addition, it has been found that phenol dialcohols further increase this adhesion.

Butyl rubber comprises a copolymer containing about 85–99.5%, preferably 95–99.5% of a $C_4$–$C_8$ isoolefin such as isobutylene, the remainder being a $C_4$–$C_{10}$ multiolefin, preferably a $C_4$–$C_6$ conjugated diolefin such as butadiene, dimethyl butadiene, piperylene or especially isoprene. The preparation of butyl-type rubbers is described in U.S. Patent 2,356,128 to Thomas et al. and also in other patents as well as in literature.

According to one embodiment of the present invention, fibrous materials such as tire cords are treated with an aqueous dispersion comprising chlorinated butyl rubber latex and a phenolic-aldehyde type resin having a mol ratio of aldehyde to phenolic above about 1.4, preferably between 1.4 and 4.0, to obtain optimum adhesion. The chlorinated butyl rubber contains at least 0.5, preferably at least 1.0 weight percent combined chlorine but not more than about "X" weight percent combined chlorine wherein $$X = \frac{35.46L}{(100-L)M_1 + L(M_2+35.46)} \times 100$$

and:

$L$ = mol percent of the multiolefin in the polymer
$M_1$ = molecular weight of the isoolefin
$M_2$ = molecular weight of the multiolefin
35.46 = atomic weight of chlorine The concentration of the resin in the aqueous solution should be between about 10 to 60 parts by weight per 100 parts latex solids.

In another embodiment of the present invention a phenol dialcohol compound is dispersed in the aqueous system, together with chlorinated butyl rubber, to form a latex. Generally, about 1 to 35 phr. (parts per 100 parts rubber) of the phenol dialcohol is employed, but it is preferred to use between about 10 and 25 phr.

The invention will be better understood from the following description wherein reference will be made to the accompanying drawing wherein the single figure is a cross-sectional view of a pneumatic tubeless tire, depicted as being mounted on a conventional tubeless type of tire wheel rim.

In the practice of the invention the fibrous materials are treated in any desired manner with an aqueous dispersion of the type hereinafter described. The treated fibers are then dried and incorporated in an unvulcanized rubber composition which is then vulcanized. The resulting composition has excellent adhesion between the fibrous materials and the rubber. Treatment of the fibrous materials with the aqueous dispersion, drying of the treated fibrous material and incorporation of the dried treated fibrous material in the rubber composition may be accomplished according to methods well known in the art.

The aqueous dispersion with which the fibrous material is treated and its method of preparation are the critical features of the present invention.

The chlorinated butyl rubber latex is prepared by dissolving chlorinated butyl rubber in a hydrocarbon solution, preferably in an aliphatic hydrocarbon of 6 to 8 carbon atoms, e.g. hexane. The hydrocarbon solution may then be emulsified by an inversion technique in which water, containing an emulsifier, is added to a solution of chlorinated butyl rubber to form a water-in-oil emulsion which is then inverted to an oil-in-water emulsion by the further addition of water.

The emulsifiers may be nonionic, anionic or cationic. Nonionic emulsifiers found useful in some combinations are the polyoxyalkenated alkyl phenols or alcohols having the formula $$R(OCHR_1CHR_1)_nOH$$

where R is an alkyl, aryl or alkaryl group, $R_1$ is an alkyl group or hydrogen and $n$ is an integer of 4 to 8 to 10 or even higher. The alkene oxide units should represent at least 40% of the total molecular weight of the compound. These compounds are prepared by condensing an alkyl phenol or an alcohol with ethylene oxide or propylene oxide. Commercial compounds which have been found useful in connection with the present invention include certain of the polyoxyethylated alkyl phenols, such as Triton X–100 (polyoxyethylated octyl phenol) and Igepal CO–430 (condensation product of nonyl phenol and ethylene oxide) or the polypropylated glycols such as Pluronic F–68 (condensation product of propylene oxide and propylene glycol).

Anionic emulsifiers useful in certain combinations include sodium lauryl sulfate, the sodium salt of the sulfates of the polyoxyethylated alkyl phenols, and sodium oleyl taurate which is prepared by condensing abietic acid or tall oil acid with sodium methyl taurine, and known as Igepon TK–42.

Cationic emulsifiers useful in preparing a chlorinated butyl rubber latex include the alkyl dimethyl benzyl ammonium chlorides, diisobutyl phenoxy-ethoxyethyl dimethyl benzyl ammonium chloride and dimethyl phenoxyethoxyethyl dimethyl ammonium chloride.

A particularly suitable emulsifier is a salt of polyoxyethylene tridecyl sulfate or polyoxyethylene nonyl phenol sulfate in combination with sodium dihydrogen orthophosphate. Generally about 5 phr. of emulsifier and 1 phr. of orthophosphate are employed. In some cases it is desirable to use a small amount of a polyoxyethylated octyl phenol, sold under the trade name Triton X-100, in addition to the above.

The dihydrogen orthophosphate may have an alkali metal, amine or ammonium salt and is generally employed in concentrations between about 0.25 and 2 phr., and preferably between 0.75 and 1.5 phr.

The initial amount of emulsifier used may vary, however it is desirable to have about 3 but less than 10 parts by weight based on polymer, in the final latex. For this reason, it is preferred that not more than 10 parts by weight be used. However, from 10 to 20 parts emulsifier based on polymer may be used, if desired. Adhesion to tire cord is improved by keeping the concentration below 15 parts, preferably below 10 parts.

After preparation of the emulsion, the hydrocarbon solvent is removed by stripping. Foaming during this step can be reduced by diluting the latex with stripped or partially stripped latex during the stripping operation. If desired, however, the foam may be allowed to carry the solvent over in a gaseous state to a cooling surface where the solvent condenses and the foam breaks, leaving an aqueous layer under a liquid solvent layer. These layers can then be separated.

Butyl latex may also be prepared with highly efficient mixing equipment, i.e., colloidal mill or sonic mixers, dispersators or the like wherein considerably less emulsifier may be used.

The phenolic-aldehyde resins which are within the purview of the present invention may be generally defined as belonging to the class of heat-hardening phenol-aldehyde type resins, preferably resins from phenolic compounds which, prior to heat-hardening or thermosetting are water soluble at least to the extent of 5-10% or more. Such resins are capable of thermally setting in the absence of any added catalysts at temperatures of about 150°-400° F., temperatures of 200°-300° F. being preferred for coating rayon whereas higher temperatures are permissible for nylon.

As phenolic compounds capable of producing resins of the above mentioned characteristics, mono or especially dihydroxy benzenes are satisfactory. Dihydroxy benzenes having the hydroxyl groups meta with respect to each other are preferred. Satisfactory phenolic compounds include phenol, cresols, phloroglucinol, xylenoils, trimethyl phenols, mono or dichloro phenols, diamyl or diisopropyl phenols, p-tertiary butyl phenol, p-phenylphenol, hydroquinone, and especially resorcinol and its derivatives, such as orcinol.

The preferred aldehydes for reaction with the above phenolic compounds are formaldehyde or materials supplying formaldehyde such as paraformaldehyde. Other suitable aldehydes include acetaldehyde, furfural, etc. The ratio of the phenolic compound to the aldehyde is preferably such that the resin, prior to thermosetting, has substantial water solubility as well as solubility in polar solvents. In order to produce the desired resin, a small amount of an alkali metal containing catalyst or other condensing agent is preferred. If sodium hydroxide is employed, it is advantageously present in amounts of about 0.02 to 0.5 percent by weight, based on reactants.

Since the presence of alkalies such as sodium and potassium hydroxide catalyzes the polymerization or condensation of the phenol and the aldehyde to form the resin, these may be present in the dispersion together with the synthetic latex, the phenolic and the aldehyde. A solution of resorcinol, formaldehyde and caustic may be aged for about 6 hours prior to mixing with the latex. Or as hereinafter described, the aging may take place after mixing with the latex.

The chlorinated butyl rubber latex is generally mixed with a phenol-formaldehyde solution, such as for example an aqueous solution containing resorcinol and formaldehyde, and the pH of the mix is adjusted, i.e., by titration with an alkali such as sodium hydroxide to between 7.5 and 9 and the mixture is allowed to stand until condensation of the phenolic and formaldehyde occurs, preferably overnight. A tire cord is dipped in the dispersion and the treated cord is then thoroughly dried in hot air, at a temperature above about 150° F., preferably about 200° F. The cords may then be embedded in an unvulcanized rubber such as butyl rubber, natural rubber, chlorinated butyl rubber, GR-S rubber (a rubbery butadiene-styrene copolymer), Buna-N rubber (a rubbery butadiene-acrylonitrile copolymer), chloroprene rubber, etc., and sulfur-vulcanized at 250° to 400° F., preferably 280° to 370° F. for about one minute up to several hours, or more, to produce a finished article having an improved bond between the coated cords and the rubber.

The above procedure produces superior articles suitable for use in constructing tire carcasses for autos, trucks, airplanes, etc., as well as numerous other uses such as conveyor belts and other products built up of a plurality of laminations of cord and a rubber such as butyl rubber; the invention being especially applicable to such products which have at least one layer of butyl rubber. The invention may also be applied in uses involving merely a single layer of a fabric such as nylon, cotton, rayon, silk, etc., which may be either coated on one or both sides, with the resin and chlorinated butyl rubber as described above.

The cure of the finished articles may be not only in the presence of sulfur or sulfur-containing vulcanization agents, but also by the use of p-dinitrosobenzene, p-quinone dioxime, p-quinone dioxime dibenzoate, tellurium diethyl dithiocarbamate, polyalkyl thiuram sulfides such as tetramethyl thiuram disulfide, phenol dialcohols, etc. The cure also preferably takes place in the presence of basic metal compounds such as bivalent metal oxides, e.g. zinc oxide.

The phenol from which the dimethylol phenol or phenol dialcohol is made generally has a hydrocarbon group in the position para to the phenolic hydroxyl, examples being alkyl groups, especially alkyl groups having from 3 to 20 carbon atoms, tertiary-butyl and tertiary-octyl (alpha, alpha, gamma, gamma-tetramethyl butyl) being especially preferred among the lower alkyls (8 carbon atoms or less), cyclo-alkyl groups, aryl groups, such as phenyl, and aralkyl groups such as benyl and cumyl. Examples of suitable dimethylol phenols that may be used in the invention either in the polymeric or monomeric form are as follows:

2,6-dimethylol-4-methyl phenol
2,6-dimethylol-4-tertiary-butyl phenol
2,6-dimethylol-4-dodecyl phenol
2,6-dimethylol-4-octyl phenol
2,6-dimethylol-4-phenyl phenol
2,6-dimethylol-4-benzyl phenol
2,6-dimethylol-4-(alpha,alpha-dimethyl benzyl) phenol
2,6-dimethylol-4-cyclohexyl phenol The dimethylol phenol is preferably employed in an amount within the range of from about 10 to 25 parts by weight to 100 parts of the butyl rubber.

Amberol ST-137 is a trade designation for a mixture of multicyclic phenol dialcohols believed to be made directly from one mol of para-octyl phenol, 2 mols of formaldehyde and 1 mol of sodium hydroxide, the alkali being carefully neutralized after the condensate is completed. It is a resinous solid.

The preferred solid, plastic, rubbery interpolymers for use in preparing chlorinated derivatives, are generally themselves prepared by low temperature (temperatures range from 0° C. to as low as −165° C. but are generally about −100° C.) interpolymerization reaction utilizing an appropriate catalyst, generally an active metal halide or Friedel-Crafts type catalyst such as aluminum chloride or boron trifluoride, dissolved in a solvent with a low freezing point such as methyl or ethyl chloride, and when so prepared, generally possess an average molecular weight on the Staudinger scale above 15,000 and up to as high as 200,000 or higher, iodine numbers in the range of 0.5 to 50, and are reactive with sulfur to yield elastic products on suitable heating. Of the preferred interpolymers, it is most desirable in preparing the chlorinated derivatives employed in this invention to utilize the solid, plastic interpolymers of isobutylene with small amounts of isoprene or butadiene, of the character of butyl rubbers, which contain about 90 to 99 wt. percent of isobutylene and about 1 to 10 wt. percent of aliphatic conjugated diolefin, and preferably containing less than 5 wt. percent of aliphatic conjugated diolefin.

The chlorinated butyl rubber is produced by reacting the unvulcanized rubber with chlorine or chlorine-containing compounds so that the polymer contains at least 0.5 weight percent of combined chlorine but not more than about 1 atom of chlorine combined in the polymer per molecule of multiolefin present therein; i.e., not more than about one atom of combined chlorine per double bond in the polymer.

Suitable chlorinating agents which may be employed are molecular chlorine, alkali metal hypochlorites (preferably sodium hypochlorite), sulfur chlorides (particularly oxygenated sulfur chlorides), pyridinium chloride perchloride, N-chlorosuccinimide, alpha-chloroacetoacetanilide, tri-chlorophenol chloride, N-chloroacetamide, beta-chloro-methyl phthalimide, N,N'-dichloro-5,5 dimethyl hydantoin and other common chlorinating agents. The preferred chlorinating agents are molecular chlorine and sulfuryl chloride. The chlorination is advantageously conducted at 0° to 100° C. and preferably at about 20° to 80° C. for about one minute to several hours. However, the temperatures and times are regulated to chlorinate the rubbery copolymer to the extent above mentioned.

The chlorination may be accomplished in various ways. One process comprises preparing a solution of the copolymer in a suitable inert liquid organic solvent such as an inert hydrocarbon or advantageously halogenated derivatives of saturated hydrocarbons, examples of which are hexane, heptane, naphtha, kerosene, straight run mineral spirits, benzene, toluene, naphthalene, chlorobenzene, chloroform, trichloroethane, carbon tetrachloride, etc., and adding thereto the chlorine or other chlorinating agent, either as such or in solution, such as dissolved in an alkyl chloride, carbon tetrachloride, etc. For example, if elemental chlorine is employed, it may be advantageously added directly to the solution of butyl copolymer or dissolved in a solvent which is then added to the copolymer. The use of elevated or depressed pressures is optional since atmospheric pressure is satisfactory although the pressure may vary from about 1 to 400 p.s.i. depending upon the foregoing temperatures and time of reaction.

The copolymer to be chlorinated is advantageously first dissolved in a solvent such as any of the foregoing, especially a saturated hydrocarbon or benzene or a completely chlorinated hydrocarbon. Particularly preferred solvents for particular chlorinating agents are as follows: carbon tetrachloride and/or chloroform and/or benzene and/or low boiling paraffinic hydrocarbons (e.g. hexane) for molecular chlorine; paraffinic hydrocarbons and/or carbon tetrachloride and/or aromatics such as benzene as non-polar solvents for chlorination with certain chlorinating agents, especially sulfuryl chloride. However, any of the above-listed chlorinating agents may be employed with an inert polar solvent for the copolymers providing the conditions of chlorination and amounts of the chlorinating agent are carefully controlled.

The invention will be better understood from the following experimental data and examples.

Three benzene solutions of the uncured butyl rubbers (GR–I–18) were chlorinated separately in a 500-gallon glass-lined Pfaudler reactor equipped with an agitator, baffle submersed stainless steel sparger ring and a conduit leading into said ring.

Gaseous chlorine was continuously added to the butyl rubber solutions over a period of one-half hour at a temperature level of 29° C. and under atmospheric pressure. The chlorine was added to the reactor through the conduit via the sparger ring which was immersed below the liquid level of the agitated butyl rubber solutions. The chlorination was then terminated and the solutions containing the chlorinated butyl rubber formed agitated for an additional ten minutes. The resulting solutions of chlorinated butyl rubber were then water washed three times to remove dissolved hydrogen chloride. There was then added to each solution 0.2 pound per 100 pounds of chlorinated butyl rubber of an antioxidant (2,6-di-tertiary butyl paracresol) as a 10 weight percent solution in benzene.

The absolute amounts of butyl rubber, benzene solvent and gaseous chlorine added, as well as the calculated percent of added chlorine based on polymer and resulting percent of chlorine combined in the polymer were as follows:

| Run No. | Lbs. of Butyl Rubber | Lbs. of Benzene Solvent | Lbs. of Chlorine | Percent Chlorine Added | Percent Chlorine combined in the Polymer |
|---|---|---|---|---|---|
| 1 | 190 | 1,740 | 5.5 | 2.9 | 1.23 |
| 2 | 193 | 1,760 | 5.6 | 2.9 | 1.22 |
| 3 | 167 | 1,530 | 4.9 | 2.9 | 1.30 |

The resulting waterwashed solutions containing the chlorinated rubbery butyl products (runs 1, 2 and 3) were then each recovered by injecting the dissolved chlorinated polymer into an agitated aqueous solution containing a commercial wetting agent of the aliphatic polyoxyethylene ether type (Sterox A.J.) in an amount of 0.6 lb. per 100 lbs. of chlorinated rubber as a dispersing aid. The solution also contained 1 lb. of zinc stearate (an anti-tack agent) per 100 lbs. of chlorinated butyl rubber; the hot agitated aqueous solutions employed each containing 4,170 lbs. of water per 100 lbs. of chlorinated butyl rubber.

Each agitated solution was maintained at a temperature between about 190° and 210° F. (i.e. 88°–99° C.) whereby to flash off the benzene solvent and form an aqueous slurry of the chlorinated butyl rubber in water. This slurry was then filtered and each chlorinated butyl rubber (runs 1, 2 and 3) which was in the form of a wet "crumb," was placed in a Proctor and Schwartz tray drier maintained at 82° C. and dried for 10 hours. The crumb depth on the tray was about one-half inch. The crumb was then completely dried and compacted by milling for 7 minutes on a conventional rubber mill having a roll temperature of about 127° C. The Mooney viscosity (8 minutes at 212° F.) for the modified copolymers of runs 1, 2 and 3, was 55, 56, and 64 respectively.

EXAMPLE 1

100 parts by weight of chlorinated butyl rubber, run 3 above, was compounded on a cold rubber mill according to the following formula:

| Ingredient: | Parts by weight |
|---|---|
| Chlorinated butyl rubber copolymer | 100 |
| Carbon black (SRF) | 50 |
| Zinc oxide | 5 |
| Stearic acid | 1 |

The resulting blend was cured for 60 minutes at 307° F. The vulcanizate had the following physical properties:

| Physical property: | |
|---|---|
| Tensile strength, p.s.i. | 1975 |
| Modulus at 300% elongation, p.s.i. | 935 |
| Elongation, percent | 495 |

The above data demonstrate that the chlorination did not harm the physical characteristics of the butyl rubber.

EXAMPLE 2

A comparison study was made to determine the effect chlorination has on the cord adhesion properties of butyl rubber. The chlorinated butyl rubber used in this experiment was made according to the procedure set forth above, run No. 3. The butyl rubber was GR I–18. In each case, 100 parts of rubber, as a 20 wt. percent solution of uncured rubber dissolved in hexane, was injected into a system containing 500 phr. of water, 5 phr. of sodium polyoxyethylene tridecyl sulfate (about 4 ethylene oxide units), 1 phr. polyoxethylene octyl phenol (8 to 10 ethylene oxide units) and 1 phr. of sodium dihydrogen orthophosphate. The mixture was recycled in a Minisonic homogenizer for about 10 minutes. The emulsion was stripped of hexane and some water to bring it to a solution having 20 to 30% by weight total solids.

Each latex was then mixed with a phenolic formaldehyde solution according to the following formula:

| Ingredient: | Weight percent |
|---|---|
| Latex solids | 15 |
| Resorcinol | 2.2 |
| Formaldehyde (37%) | 3.5 |
| Water | 79.3 |

The molar ratio of formaldehyde to resorcinol is 2.1. It may vary from about 1.4 to 10 without significantly affecting the adhesion. The mols of resorcinol-formaldehyde/100 parts rubber may vary between 0.1 to 1, or more. The pH of the mixture was adjusted to 8.3 with sodium hydroxide and allowed to stand overnight. A rayon tire cord was dipped in each latex and dried at 250° F. for 5 minutes. The dried cord was cured in a butyl rubber carcass which had the following recipe:

| Ingredient: | Parts by weight |
|---|---|
| Butyl rubber (GR-I-25) | 100 |
| Carbon black (MPC) | 50 |
| Stearic acid | 1 |
| Sulfur | 2 |
| Zinc oxide | 5 |
| Naphthenic base oil | 15 |
| Tellurium diethyl dithiocarbamate | 1 |

The naphthenic base oil used had a specific gravity of 0.85–0.97, a flash point between 400–550, a S.S.U. viscosity at 100° F. between 300–1000 and an iodine number (cg./g.) of about 16.

The carcass stocks were cured in a mold which provides a sample for the "H" test. The "H" test is described in Rubbery Chemistry and Technology, volume 20, pages 268 et seq., 1947. Essentially, the H test is a measurement of the force required to pull a single cord, in the direction of its axis, from a strip of rubber in which one end of the cord is imbedded over a given length. Thus the quantity measured is the shearing force acting across the cord-rubber surface. The opposite end of the piece of cord is held in the pulling clamp by lateral pressure from jaws, transmitted through a second rubber strip. The two end strips with the interconnecting cord form a specimen resembling the letter H, from which the test derives its name. The H-shaped specimens are obtained by cutting them from a cast molded for this purpose and consists of a number of rubber strips interconnected at intervals by cords which extend through all the strips. The adhesions are measured at 75° F. and the cord is pulled at a rate of 10 inches per minute. The H test results obtained with butyl rubber and chlorinated butyl rubber are as follows:

Table I

| Latex: | H test adhesion, lbs. |
|---|---|
| Butyl rubber | 14.9 |
| Chlorinated butyl rubber | 17.9 |

These data show that by chlorinating butyl rubber according to the method herein disclosed, rubber having superior adhesive properties is produced. This is a very important property in butyl rubber because some difficulty has been encountered in obtaining butyl rubber which will strongly adhere to tire cords, particularly the rayon and nylon variety.

EXAMPLE 3

In another attempt to increase the cord adhesive properties of butyl rubber, a phenol dialcohol was added to the latex. The latices were prepared according to the same procedure outlined in Example 2 with the exception that 24 phr. of a phenol dialcohol was added to the hexane solution prior to the emulsification step in the case of butyl rubber, while 25 phr. of a phenol dialcohol was added to the hexane solution of chlorinated butyl rubber. The results of this study are set forth below:

Table II

EFFECT OF PHENOL DIALCOHOLS ON CORD ADHESION PROPERTIES

| Latex: | H test adhesion, lbs. |
|---|---|
| Butyl rubber+Amberol ST-137 | 11.9 |
| Chlorinated butyl rubber+Amberol ST-137 | 18.9 |

Surprisingly, the Amberol ST-137 decreases the adhesion properties of butyl rubber, while in the case of the chlorinated butyl rubber it enhances the adhesive properties. Because of this unexpected superiority of the chlorinated butyl rubber-phenol dialcohol combination, a number of other experiments were conducted with this composition.

EXAMPLE 4

Again, the same procedure outlined in Example 2 was employed with the exception that varying quantities of Amberol ST-137 were added to the chlorinated butyl rubber hexane solution.

Table III

EFFECT OF VARYING THE QUANTITY OF PHENOL DIALCOHOL

| Amberol ST-137, phr. | 12 | 25 |
|---|---|---|
| H Test Adhesion, lbs. | 19.1 | 18.9 |

The results show that the addition of about 12 to 25 phr. of phenol dialcohol to the rubber hexane solution increases the adhesion of chlorinated butyl rubber by about 1 pound over that obtained with a chlorinated butyl latex containing no phenol dialcohol. Thus it appears that adding between about 12 to 25 phr. of a phenol dialcohol will enhance the cord adhesion properties of chlorinated butyl rubber while on the other hand, when similar quantities of phenol dialcohol are added to non-chlorinated butyl rubber, they have a deleterious effect.

A general formula for chlorinated butyl rubber latices which may be used according to the present invention is as follows:

| Ingredient: | Parts by weight |
| --- | --- |
| Chlorinated butyl rubber | 100 |
| Phenol dialcohol | 0–25 |
| Emulsifier | 3–5 |
| Stabilizer (orthophosphate) | 0–1 |
| Water | 60–900 |

Usually between about 0.1 to 1 mol of a phenolic-formaldehyde composition is added to the latex.

In summary, therefore, it has been discovered that latices prepared with chlorinated butyl rubber have superior cord adhesive properties to similar latices prepared with non-chlorinated butyl rubber. In addition, it has been found that while the inclusion of a phenol dialcohol in a butyl rubber latex decreases its cord adhesion properties, the same compound when included in a chlorinated butyl rubber latex produces a product having superior adhesion properties.

In accordance with the present invention, butyl rubber containing 0.5 wt. percent combined chlorine, but not more than one combined atom of chlorine per double bond in the polymer, is used to prepare latices having superior adhesion properties. Furthermore, between about 1 and 35 phr. of a phenol dialcohol compound may be added to the chlorinated butyl rubber latex to produce a composition having improved cord adhesion properties. A preferred embodiment of this invention is where between about 10 and 25 phr., and especially about 12 phr., of phenol dialcohol is included in a chlorinated butyl rubber latex.

One particularly advantageous use for the chlorinated butyl rubber phenolic aldehyde resin combinations of the present invention is in pneumatic tires of either the inner tube containing variety or in a tubeless type tire.

Referring now to the drawing, the single figure depicts a pneumatic tubeless tire which comprises a hollow toroidal type member which is substantially U-shaped in cross-section by virtue of an open portion which extends around the inner periphery of the member. In other words, the tire is of a tubular type structure which has a cross-section in the form of an open-bellied body with spaced terminal portions to define a member generally resembling a horseshoe. The terminal portions constitute the bead portions 11—11 of the tire inside of which are a plurality of bead wires adhesively imbedded and molded in a rubber. The outer surface of the bead portion is advantageously formed into an air sealing means, such as a plurality of ribs to aid in adhesion to rim 12 when the tire is inflated.

The outer surface of the tire also includes tread area 13 and sidewalls 14. The open portion of the horseshoe-shaped tire faces that portion of the inner circumference of the tire which is adjacent the said tread area 13 of the tire. The remaining construction of the tire may vary according to conventional fabrication, but in general the tire is a multi-layered type of structure with an outer layer as above mentioned. The layer next adjacent the outer layer generally comprises a carcass 15 which includes a rubber having incorporated therein a fabric composed of a plurality of cotton, rayon or nylon cords.

According to one embodiment of this invention, the tire cords are coated with an aqueous dispersion of chlorinated butyl rubber and a resinous phenolic-aldehyde condensation product, preferably resorcinol-formaldehyde. The chlorinated butyl rubber contains at least 0.5 wt. percent combined chlorine but not more than about 1 combined atom of chlorine per double bond in the polymer. The resulting cord, when dried, has been found to have a much greater adhesion after vulcanization at about 250 to about 400° F. to butyl in the carcass layers of the tire.

The tire also includes an inner lining advantageously made from rubber, e.g. butyl rubber or chlorinated butyl rubber, which must be substantially impermeable to air. For example, the lining may advantageously comprise natural rubber, or rubbery copolymer, chlorinated copolymer or mixtures of any of the above wherein the copolymer comprises the reaction product of about 85 to 99.5 wt. percent of a $C_4$–$C_8$ isoolefin, such as isobutylene, and about 0.5 to 15 wt. percent of a $C_4$–$C_{10}$ multiolefin, such as isoprene, which has been at least partially vulcanized by heating in the presence of a vulcanization agent for from several minutes to 5 hours at 200° to 400° F. The above multi-layers, at least 3 in number, are conventionally bonded or otherwise adhered together, for example, by cementing and/or especially by vulcanization, etc., to form a tire of a unitary structure.

The chlorinated butyl rubber and phenolic-aldehyde compositions of the present invention may be employed in the tire carcass alone or in admixture with minor proportions of natural rubber or certain synthetic rubbers to include chloroprene rubber, polyisoprene, and particularly copolymers of butadiene with acrylonitrile (e.g. Buna–N rubber) or copolymers of butadiene with styrene such as GR–S rubber, etc.

An intermediate or carcass layer including a rubber and a plurality of fibrous cords and/or fabric, must be of both desirable rigidity and strength. The performance of this layer is therefore dependent upon the bond or adhesion between the cords or fabric and the rubber. Certain synthetic rubbers, and especially butyl rubber, do not normally have good adhesion to such fibrous materials, particularly if they are synthetic such as rayon, and especially nylon. The present invention has solved this difficulty by providing a strong bond between butyl rubber and such fibres. This is accomplished by employing the coating compositions and techniques as hereinbefore described.

While there are above described a number of specific embodiments of the present invention, it is obviously possible to produce other embodiments and various equivalent modifications and variations thereof without departing from the spirit of the invention or the scope of the appended claims.

What is claimed is:

1. A fibrous material coated with a layer comprising 100 parts by weight of a rubbery copolymer composed of 85 to 99.5 wt. percent of a monoolefin having 4 to 8 carbon atoms and 0.5 to 15 wt. percent of a multiolefin having 4 to 10 carbon atoms, said copolymer containing at least 0.5 wt. percent combined chlorine but not more than about 1 atom of combined chlorine per double bond in the copolymer, and about 0.1 to 1 mol of a water soluble thermosetting phenolic-aldehyde resin, said resin being prepared in the presence of an alkali metal-containing catalyst with a phenol aldehyde ratio between 1.4 and 4.0 at a pH between 7.5 and 9.

2. A fibrous material according to claim 1 in which there is between about 1 and 35 parts by weight of 2,6-dimethylol para-hydrocarbon substituted phenol in the layer.

3. A rubber tire which contains in its carcass a plurality of cords imbedded in rubber, said cords having been coated with a mixture of a water soluble thermosetting phenolic-aldehyde resin, said resin being prepared in the presence of an alkali metal-containing catalyst with a phenol aldehyde ratio between 1.4 and 4.0 at a pH between 7.5 and 9 and a latex of a chlorinated copolymer containing at least 0.5 wt. percent of combined chlorine but no more than 1 atom of combined chlorine per double bond, said copolymer being composed of 85 to 99.5 wt. percent of an isoolefin having 4 to 8 carbon atoms and 0.5 to 15 wt. percent of a multiolefin having 4 to 10 carbon atoms, to improve the adhesion of said cords to the rubber in which they are imbedded.

4. A rubber tire according to claim 3 in which the mixture used to coat the cords contained between about 1 to 35 phr. of a 2,6-dimethylol para-hydrocarbon substituted phenol.

References Cited in the file of this patent

UNITED STATES PATENTS

| | | |
|---|---|---|
| 2,458,222 | Talalay | Jan. 4, 1949 |
| 2,691,614 | Wilson | Oct. 12, 1954 |
| 2,701,895 | Tawney et al. | Feb. 15, 1955 |
| 2,732,354 | Morrissey et al. | Jan. 24, 1956 |
| 2,799,662 | Ernst et al. | July 16, 1957 |

UNITED STATES PATENT OFFICE
CERTIFICATION OF CORRECTION

Patent No. 2,943,664　　　　　　　　　　　　　　　July 5, 1960

Francis P. Baldwin et al.

It is hereby certified that error appears in the above numbered patent requiring correction and that the said Letters Patent should read as corrected below.

Column 10, lines 60 and 61, and line 71, for "a phenol aldehyde ratio between 1.4 and 4.0", each occurrence, read -- formaldehyde to phenol mol ratio from about 1.4 to 10 --.

Signed and sealed this 16th day of May 1961.

(SEAL)
Attest:

ERNEST W. SWIDER　　　　　　　　　　　　　　　DAVID L. LADD
Attesting Officer　　　　　　　　　　　　　　　　Commissioner of Patents